United States Patent
Leis et al.

(10) Patent No.: US 11,393,641 B2
(45) Date of Patent: Jul. 19, 2022

(54) CARBON ELECTRODE MATERIALS FOR PSEUDOCAPACITORS AND A PSEUDOCAPACITOR

(71) Applicant: Skeleton Technologies Group OU, Tallinn (EE)

(72) Inventors: Jaan Leis, Viimsi vald (EE); Anti Perkson, Viimsi vald (EE); Sebastian Pohlmann, Viimsi vald (EE); Mati Arulepp, Viimsi vald (EE)

(73) Assignee: Skeleton Technologies Group OU, Tallinn (EE)

( * ) Notice: Subject to any disclaimer, the term of this patent is extended or adjusted under 35 U.S.C. 154(b) by 0 days.

(21) Appl. No.: 16/981,718

(22) PCT Filed: Jan. 29, 2019

(86) PCT No.: PCT/IB2019/050725
§ 371 (c)(1),
(2) Date: Sep. 17, 2020

(87) PCT Pub. No.: WO2019/130287
PCT Pub. Date: Jul. 4, 2019

(65) Prior Publication Data
US 2021/0005399 A1 Jan. 7, 2021

Related U.S. Application Data

(60) Provisional application No. 62/610,973, filed on Dec. 28, 2017.

(51) Int. Cl.
*H01G 11/26* (2013.01)
*H01G 11/34* (2013.01)
*H01G 11/62* (2013.01)

(52) U.S. Cl.
CPC ............. *H01G 11/26* (2013.01); *H01G 11/34* (2013.01); *H01G 11/62* (2013.01)

(58) Field of Classification Search
CPC ......... H01G 11/26; H01G 11/34; H01G 11/62
See application file for complete search history.

(56) References Cited

U.S. PATENT DOCUMENTS

| | | | |
|---|---|---|---|
| 9,437,372 B1 * | 9/2016 | Zhamu | C04B 35/52 |
| 9,754,726 B2 * | 9/2017 | Onagi | H01G 11/64 |
| 10,269,506 B1 * | 4/2019 | Tartivita | H01G 11/82 |
| 2017/0200943 A1 * | 7/2017 | Kawakami | H01G 11/40 |
| 2019/0157719 A1 * | 5/2019 | Matsumoto | H01M 6/16 |

FOREIGN PATENT DOCUMENTS

WO 2017163464 A1 9/2017

OTHER PUBLICATIONS

International Preliminary Report on Patentability for PCT Appl. No. PCT/IB2019/050725, dated Jun. 30, 2020, 13 Pages.
Chenguang Liu, et al: "Graphene-Based Supercapacitor with an Ultrahigh Energy Density", Nano Letters, vol. 10, No. 12, Dec. 8, 2010. pp. 4863-4868.
Khalid Mohmmad, et al: "Carbon-Based Composites for Supercapacitor", Nov. 5, 2018.
International Search Report and Written Opinion for PCT Appl. No. PCT/IB2019/050725, dated Jun. 7, 2019, 19 Pages.

* cited by examiner

*Primary Examiner* — Dion R. Ferguson
(74) *Attorney, Agent, or Firm* — Maine Cernota & Rardin

(57) ABSTRACT

The present invention is related to ultracapacitors (or supercapacitors) and to the carbon electrode materials for ultracapacitors. A ultradocapacitor according to the invention comprises at least one pair of oppositely charged microporous carbon electrodes composed of an electrochemically active carbon material wherein an active carbon surface is modified with plurality of atoms or functional groups with a free electron pair covalently bound to hexagonal carbon, and an electrolyte containing ions forming an electrical double layer on the surface of electrically charged carbon electrode and a component changing a state of charge during recharging of the ultracapacitor. The carbon is preferably CDC (carbon derived carbon) activated by high temperature (600-1000° C.) chlorine treatment.

6 Claims, 1 Drawing Sheet

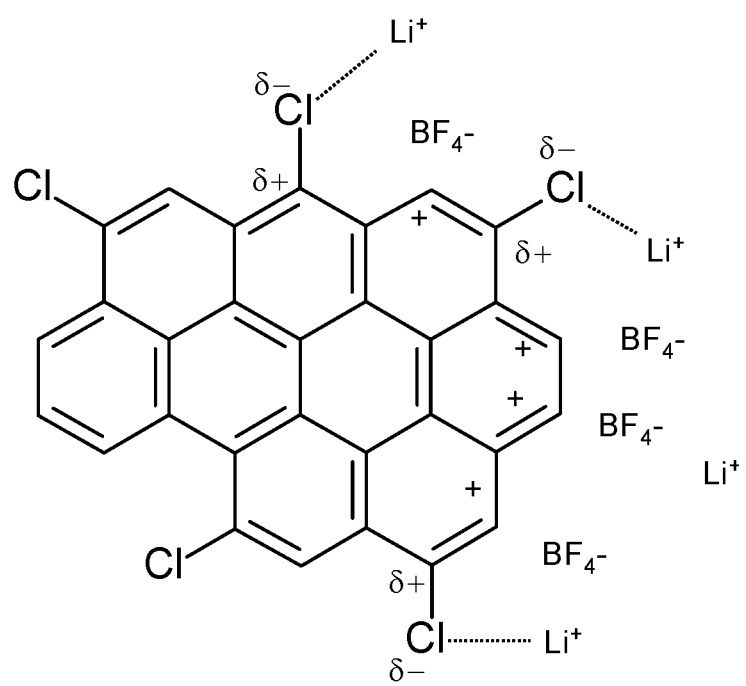

CARBON ELECTRODE MATERIALS FOR PSEUDOCAPACITORS AND A PSEUDOCAPACITOR

RELATED APPLICATIONS

This application is a national phase application filed under 35 USC § 371 of PCT Application No. PCT/IB2019/050725 with an International filing date of Jan. 29, 2019, which claims the benefit of U.S. Provisional Application No. 62/610,973 filed on Dec. 28, 2017. Each of these applications is herein incorporated by reference in its entirety for all purposes.

FIELD OF THE INVENTION

The herein disclosed invention is related to the field of energy storage, specifically to the field of ultracapacitors, more specifically so called pseudocapacitors. The present invention also relates to the carbon electrode materials for pseudocapacitors.

BACKGROUND OF THE INVENTION

The ultracapacitor (or also called supercapacitor) described herein exhibits increased energy density though the combination of nanoporous carbon materials and pseudocapacitive electrolytes.

Ultracapacitors generally comprise an active material immobilized within two electrodes, an electrolyte in contact with said electrodes, an ion-permeable separator to separate the two electrodes, and a casing to enclose the system.

State of the art Ultracapacitors are used in different applications in which power density is of higher importance than energy density. In order to increase the general field of applications for Ultracapacitors, their energy density must be increased to the values above 30 Wh/L.

Generally, Ultracapacitors can be divided into several classes. The most prominent class is the one of electrochemical double layer capacitors (EDLCs), energy storage devices, which store the energy physically in the electrochemical double layer. These devices are commercially available and provide energy densities up to 10 Wh/L on device level.

Another class of Ultracapacitors are so called pseudocapacitors, which utilize reversible electrochemical processes on the electrode-electrolyte interface [Akinwolemiwa et al. J. Electrochem. Soc. 162 (2015) A5054-A5059]. These processes can be caused choosing different active materials, such as metal oxides ($RuO_2$, $MnO_2$). Additionally, the pseudocapacitive component can be present in the electrolyte of the device, such as Hydroquinones or Halogenides. The examples of possible pseudocapacitive additives in electrolytes are discussed in documents: [Lota et al. Electrochem. Comm. 13 (2011) 470-473; Senthilkumar et al. J. Mater. Chem. A, 1 (2013) 12386-12394; Frackowiak et al. Faraday Discuss. 172 (2014) 179-198].

Pseudocapacitors generally field aqueous electrolytes, as their mechanism of energy storage is dependent on proton exchange mechanisms.

As aqueous electrolytes limit the operative voltage of those devices to values below 1.2 V, their energy density is limited to values of up to 50 Wh/L on material level, corresponding to ca. 15 Wh/L on device level.

In one background art [Yu et al. J. of Power Sources 248 (2014) 1123-1126], a pseudocapacitive electrolyte in organic media is discussed. The electrolyte in question functions at 2.5 V, delivering 54 Wh/kg on a material level, roughly translating to ca. 18 Wh/L on a device level. Another document [Sun et al. Microporous Mesoporous Mater. 128 (2010) 56] describes the Cu2+ additive in ionic liquid, [EMIm]BF4, electrolyte with activated carbon electrodes. Due to redox processes at Cu additive almost two-fold increase in capacitance was observed compared to the capacitance in pure ionic liquid. However, despite of high energy density of 45 Wh/kg achieved, this electrolyte exhibited a poor electrochemical stability due to the formation of copper dendrite on the electrode surface.

The energy density of Ultracapacitors comprising pseudocapacitive electrolytes is directly related to the active electrode surface area available to said electrolytes. In the currently known systems, the active material in the electrodes generally is the activated carbon (AC), exhibiting specific surface areas (SSAs) of up to 1500 $m^2/g$. However, the active surface area in those systems is also dependent on the available micropores to the electrolyte and the pseudocapacitive species. In ACs, the pore size distribution is broad, and thus the active surface area is reduced.

The herein proposed Ultracapacitor aims at providing a high energy density of >30 Wh/L on a device level by combining carbide derived carbons with a narrow pore size distribution and an organic electrolyte with pseudocapacitive function.

SUMMARY OF THE INVENTION

This invention describes an electrochemical energy storage device, which is characterised by superior energy density, while combining physical EDL (electrochemical double layer) and chemical electrode-electrolyte interaction energies.

Superior energy density by the carbon electrode can be achieved if the following criteria are fulfilled:
1) an electrode has sufficient electrical conductivity to deliver electrical charge to the current collector, whereas the conductivity of conventional activated carbons is approximately 10 to 20 S/cm;
2) the electrochemically active carbon component of the electrode material must have high accessible surface area to the electrolyte ions, whereas the maximum theoretical surface area of electrically conductive carbon is 2630 m2/g as calculated for the single layer graphene sheet;
3) the electrochemically active carbon component of the electrode must have narrow pore size distribution with a characteristic pore size close to the size of electrolyte ions;
4) the electrode must have sufficient quantity of well-distributed meso and macropores for the efficient transport of electrolyte ions onto the surface of electrochemically active carbon particles in the electrode;
5) the active carbon component of the electrode must have controlled degree of graphitization—curved graphene layers randomly distributed to each other to ensure good electrical conductivity within and between carbon particles in the electrode material;
6) the active carbon component of the electrode must have surface functionalities, which support the reversible chemical interactions between the electrode surface and electrolyte ions.

Assuming the size of aprotonic electrolyte ions of less than 0.7 nm (nanometer), a suitable carbon material for the carbon electrodes of this invention is a nanoporous hexagonal (mainly sp2 hybridized) carbon with the peak pore size of at least 0.7 nm. In the other hand, it can be shown experimentally that the pore sizes above 1 nm reduce significantly the packing density of the electrochemically active surface area, and therefore, the dominating pore size of higher than 1.0 nm is out of the pore size range allowed according to this invention.

Ionic liquids like EMI (1-ethyl-3-methylimidazolium) salts are known to yield the highest double layer capacitance with nanoporous carbon electrodes in aprotonic EDL capacitors, which presumable cause is found in asymmetric ions. EMI cation size at the shortest edge is only 0.43 nm and anion size of as small as 0.29 nm, which allows an efficient usage of electrode nanopores even below 0.8 nm, usually inaccessible for the ions in common organic electrolytes like TEA-BF4 (tetraethylammonium tetrafluoroborate) or TEMA-BF4 (triethylmethylammonium tetrafluoroborate). The specific capacitance of highly nanoporous CDC (carbide derived carbon) material with a peak pore size at ~0.7 nm, tested in EMI-TFSI (1-Ethyl-3-methylimidazolium bis-(trifluoromethylsulfonyl)-imide) electrolyte is reported about 160 F/g [Largeot et al. JACS 130 (2008) 2730-2731].

Based on this EDL capacitance value (160 F/g), the corresponding elementary charged particles per gram of the active electrode material is $2.81 \times 10^{21}$. On the other hand, the calculated number of carbon atoms in one gram of carbon is $5.22 \times 10^{22}$. Based on this value, the calculated number of carbon atoms involved in the real electric double layer capacitance by one electron is about 17.8. This means that one adsorbed electrolyte ion uses ~18 carbon atoms to yield the electrical elementary charge. Theoretical EDL charge density is one $-1e$ per 6 carbon atoms as discussed by B. E Conway in 1999 (Electrochemical Supercapacitors. Scientific Fundamentals and Technological Applications, 1999). However, due to the bonding between condensed hexagonal carbon cycles and the geometric restrictions in nanoporous carbon network not all the surface is accessible to ions.

According to the present invention, this capacitance is at least doubled by using optimally surface-functionalized nanoporous carbon like for example CDC type carbon synthesized from metal or metalloid carbides and the electrolyte comprising ions with a size of less than the size of carbon micropores and containing the component, which reversibly changes the state of charge during recharging of the ultracapacitor.

A suitable chemical surface modification of the electrochemically active carbon component of the electrode of this invention that can support the electrolyte electrode reversible chemical interactions providing additional pseudocapacitive energy storage can for example be any covalently bonded electrochemically stable functional group, which has a free electron pair. One of these is a chlorine-functionalized surface-modified carbon, which can be made:

by high-temperature chlorine treatment of metal or metalloid carbide;
  by chlorine treatment of nano- or microporous activated carbon at high temperature;
  by milling of nano- or microporous carbon in chlorine atmosphere.

One example of present invention thus describes the aprotic ultracapacitor incorporating pseudocapacitance from reversible interactions between chlorine free electron pair and positively charged cation of the electrolyte.

The reversible chemical interaction between surface chlorine and the electrolyte is schematically presented in the FIG. 1.

One of the object of present invention thus is a microporous carbon material for the energy storage characterised by curved graphene layers randomly distributed to each other, and comprising of a surface modified with plurality of halogen atoms covalently bound to hexagonal carbon.

Comprehensive table with the examples of nanoporous carbon electrodes yielding pure EDL capacitance (examples 1-12 with SPIRO/PC electrolyte) and those yielding EDL+ pseudocapacitance (examples 1-12 with LiPF6/EC-DMC electrolyte-lithium hexafluorophosphate solution in ethylene carbonate and dimethyl carbonate). Examples 1-6 present the surface modified nanoporous carbon electrodes having at least 3% wt. of Chlorine atoms covalently bound to the surface of electrochemically active carbon. The highest combined EDL+pseudocapacitance is achieved with the materials of Examples 5-6 with LiPF6/EC-DMC, which confirms the claimed statements of this invention.

TABLE 1

Inventive examples (2-6) and Comparative example (1, 7-8) characterising the effect of pseudocapacitance and confirming the advanced capacitance

| | | | | | | C @ 0.5 mA [F/g] | | | |
| | | | | | | C(POS) | | C(NEG) | |
| # | CDC | Material ID | BET [m²/g] | $V_{Total}$ [cm³/g] | $V_{micro}$ [cm³/g] | Electrode ID | SPIRO/ PC | LiPF6/ EC-DMC | SPIRO/ PC | LiPF6/ EC-DMC |
|---|---|---|---|---|---|---|---|---|---|---|
| 1 | C(TiC)-500 | 293 | 1062 | 0.845 | 0.457 | 306 | 103 | n/a | 57.3 | n/a |
| 2 | C(TiC)-600 | 292 | 1127 | 0.517 | 0.484 | 304 | 112.3 | 70.8 | 78.6 | 67.9 |
| 3 | C(TiC)-700 | 289 | 1175 | 0.54 | 0.506 | 302 | 124.9 | 90.8 | 104 | 101.9 |
| 4 | C(TiC)-800 | 288 | 1325 | 0.612 | 0.563 | 300 | 133.2 | 113.6 | 122.5 | 94 |
| 5 | C(TiC)-900 | 285 | 1423 | 0.674 | 0.595 | 299 | 116.2 | 150.6 | 110.5 | 134.6 |
| 6 | C(TiC)-1000 | 284 | 1488 | 0.72 | 0.597 | 296 | 114.3 | 142.7 | 100.2 | 120.5 |
| 7 | C(TiC)-500-H2 | 295 | 1175 | 0.539 | 0.505 | 307 | 130.7 | 79.1 | 96.7 | 93.6 |
| 8 | C(TiC)-600-H2 | 294 | 1287 | 0.588 | 0.554 | 305 | 126.3 | 99.9 | 102.9 | 77.8 |
| 9 | C(TiC)-700-H2 | 291 | 1376 | 0.634 | 0.587 | 303 | 137.2 | 141.5 | 119.5 | 86.1 |
| 10 | C(TiC)-800-H2 | 290 | 1388 | 0.643 | 0.587 | 301 | n/a | 70.9 | n/a | 73.7 |
| 11 | C(TiC)-900-H2 | 287 | 1459 | 0.687 | 0.606 | 298 | 123 | 124.4 | 111.5 | 89.7 |
| 12 | C(TiC)-1000-H2 | 286 | 1489 | 0.72 | 0.605 | 297 | 120.9 | 113.8 | 111 | 82.4 |

Furthermore, since the total capacitance of pseudocapacitive ultracapacitor comprises both the electrical double-layer capacitance and the pseudocapacitance, the important characteristic of the electrode is the average pore size (APS) of the electrochemically active carbon. In the case of carbide-derived carbon (CDC), the general rule is that the higher synthesis temperature of CDC, the higher is APS. Different electrolytes have different ion sizes, which prefer different APS for the high EDL capacitance. Examples of the high EDL capacitances achieved with nanoporous CDC in different electrolytes are represented in Table 2, which also includes an example with LiPF6/EC-DMC showing superior specific capacitance due to the additional pseudocapacitive component shown in FIG. 1.

TABLE 2

Specific capacitance and specific energy for different electrochemical systems.

| CDC (carbide-synthesis temperature) | Electrolyte | C (F/g) | Energy at 2.85 V, Wh/kg, per material | Source of information |
|---|---|---|---|---|
| TiC-600 | EMIBF4 | 160 | 45.1 | (Test cell) AABC 2010 |
| TiC-700 | SPIRO/PC | 128 | 36.1 | (Test cell) Li-CAP project |
| TiC-600 | TEMA/AN | 129 | 36.4 | (Test cell) Li-CAP project |
| TiC-800 | TEMA/AN | 135 | 38.1 | (Test cell) Li-CAP project |
| TiC-900 | LiPF6/EC + DMC | 142 | 40.0 | (Test cell) Li-CAP project |
| TiC-600/TiC-800-LPT | TMEA/AN | 130 | 36.7 | 1460F Ultracapacitor * |
| TiC-900 | TEMA/AN | 119 | 33.6 | 4400F Ultracapacitor ** |

* 1460 F Skeleton Technologies device is prismatic 38*38*89 mm with a total weight of 202 g
** 4400F Skeleton Technologies device, cylindrical (60 mm*138 mm) with a total weight of 536 g The following example comprises an estimate of the performance for the ultracapacitor with combined EDL— and Pseudocapacitance according to this invention.

Bases of Calculations:

EDL capacitance of CDC electrode: 160 F/g in ionic liquid (IL).

Consequently, assuming the conversion factor of 2.6 between EDLC and EDLC+pseudo, the total specific capacitance including pseudocapacitance is 160 F/g*2.6=416 F/g (per CDC electrode), which is 104 F/g (per CDC electrode pair).

In today's 3200 F ultracapacitor is ca 127 g YP50 carbon electrode (density 0.6 g/cm3).

Assuming the density of CDC slurry-coated electrode 0.75 g/cm3, the "real" weight of electrode is 159 g, which gives for the device the total capacitance (EDLC+Pseudo) of 104 F/g*159 g=16536 F Pure EDL-based Ultracapacitor weight with YP50: 533 g
Weight of the ultracapacitor due to higher density of CDC compared to YP50:

533 g+32 g=565 g (with Acetonitrile electrolyte)

Electrolyte weight with IL is higher and yields the weight difference:

300 g (IL)−214 g (AN)=86 g (density of IL ~1.3 g/cm3)

Weight of the ultracapacitor with IL electrolyte:

565 g+86 g=651 g

Total energy (EDLC+pseudocapacitance) of the ultracapacitor at the working voltage of 3.0 V:

16536 F*3V ^2*0.5/3600=20.7 Wh

Specific Stored Energy of Device:

E=20.7/0.651=31.8 Wh/kg (IL)

Ed=20.7/0.39=53.8 Wh/L

BRIEF DESCRIPTION OF THE DRAWINGS

FIG. 1 is a schematic illustration of a skeletal formula showing the reversible chemical interaction between surface chlorine and the electrolyte.

The invention claimed is:

1. A pseudocapacitor comprising of at least one pair of oppositely charged microporous carbon electrodes composed of
an electrochemically active nanoporous hexagonal carbon material with the peak pore size at least 0.7 nm but not higher than 1.0 nm measured by gas adsorption wherein an active carbon surface of the carbon material is modified with plurality of atoms or functional groups with a free electron pair covalently bound to nanoporous hexagonal carbon material, and
a nonaqueous electrolyte containing ions forming an electrical double layer on the surface of electrically charged microporous carbon electrode and changing a state of charge during recharging of the ultracapacitor, wherein the nonaqueous electrolyte is a lithium hexafluorophosphate solution in ethylene carbonate and dimethyl carbonate having ions with a size of less than the size of carbon micropores of the electrochemically active nanoporous hexagonal carbon material.

2. The pseudocapacitor according to claim 1, wherein changing of a state of charge of the electrolyte are caused by reversible interaction of the ions with the atoms or functional groups on the surface of microporous carbon electrodes.

3. The pseudocapacitor according to claim 1, wherein the electrochemically active nanoporous hexagonal carbon material contains curved graphene layers randomly distributed to each other, and active carbon surface of the carbon material is modified with plurality of halogen atoms covalently bound to nanoporous hexagonal carbon material.

4. The pseudocapacitor according to claim 1, wherein the electrochemically active nanoporous carbon material with chemically modified surface is a chlorine-functionalized surface-modified carbon manufactured by high-temperature chlorine treatment of metal or metalloid carbide.

5. The pseudocapacitor according to claim 1, wherein the electrochemically active nanoporous carbon material with chemically modified surface is a chlorine-functionalized surface-modified carbon manufactured by chlorine treatment of nano- or microporous activated carbon at temperature between 600-1000 C°.

6. The pseudocapacitor according to claim 1, wherein the electrochemically active nanoporous carbon material with chemically modified surface is a chlorine-functionalized surface-modified carbon manufactured by milling of nano- or microporous carbon in chlorine atmosphere.

* * * * *